United States Patent
Musgrove et al.

(10) Patent No.: US 9,912,420 B1
(45) Date of Patent: Mar. 6, 2018

(54) ROBUST POWER DETECTOR FOR WIDEBAND SIGNALS AMONG MANY SINGLE TONE SIGNALS

(71) Applicant: National Technology & Engineering Solutions of Sandia, LLC, Albuquerque, NM (US)

(72) Inventors: Cameron H. Musgrove, Albuquerque, NM (US); Douglas Thompson, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 0 days.

(21) Appl. No.: 15/474,089

(22) Filed: Mar. 30, 2017

Related U.S. Application Data

(60) Provisional application No. 62/318,643, filed on Apr. 5, 2016.

(51) Int. Cl.
  *H04B 17/00* (2015.01)
  *H04B 17/345* (2015.01)
  *H04B 17/23* (2015.01)
  *H04B 15/02* (2006.01)

(52) U.S. Cl.
  CPC ........... *H04B 17/345* (2015.01); *H04B 15/02* (2013.01); *H04B 17/23* (2015.01)

(58) Field of Classification Search
  USPC ...................................................... 455/226.4
  See application file for complete search history.

(56) References Cited

U.S. PATENT DOCUMENTS

| | | | |
|---|---|---|---|
| 6,570,394 B1* | 5/2003 | Williams | H04B 3/46 324/620 |
| 6,630,897 B2 | 10/2003 | Low et al. | |
| 6,765,532 B2 | 7/2004 | Vaccaro et al. | |
| 7,454,179 B1 | 11/2008 | Lee | |
| 7,801,242 B2* | 9/2010 | Garmany | H04B 7/005 455/570 |
| 8,817,915 B2 | 8/2014 | Briand | |
| 8,867,561 B2* | 10/2014 | Urban | H04L 1/0002 455/226.1 |
| 9,398,587 B1 | 7/2016 | Kong et al. | |
| 2006/0013435 A1* | 1/2006 | Rhoads | G06T 1/005 382/100 |
| 2006/0160495 A1* | 7/2006 | Strong | H04B 7/04 455/101 |
| 2015/0334668 A1* | 11/2015 | Weber | H04W 56/001 455/404.1 |
| 2016/0011295 A1* | 1/2016 | Keegan | H04L 27/2601 455/456.1 |
| 2017/0295048 A1* | 10/2017 | Terry | H04L 27/2614 455/226.4 |

* cited by examiner

*Primary Examiner* — Lana N Le
(74) *Attorney, Agent, or Firm* — Medley, Behrens & Lewis, LLC

(57) ABSTRACT

Various technologies for isolating a signal of interest from signals received contemporaneously by an antenna are described herein. A time period for which a signal of interest is present in a second signal can be identified based upon ratios of values of the second signal to the mean value of the second signal. When the ratio of the value of the second signal at a particular time to the mean of the second signal exceeds a threshold value, the signal of interest is considered to be present in the second signal.

12 Claims, 5 Drawing Sheets

ROBUST POWER DETECTOR FOR WIDEBAND SIGNALS AMONG MANY SINGLE TONE SIGNALS

RELATED APPLICATIONS

This application claims priority to U.S. Provisional Patent Application No. 62/318,643, filed on Apr. 5, 2016, and entitled "ROBUST POWER DETECTOR FOR WIDEBAND SIGNALS AMONG MANY SINGLE TONE SIGNALS", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Antennas are deployed in many remote sensing, communications, and other applications in which characteristics of a signal of interest received by an antenna are used to identify characteristics of an environment, convey information, etc. In many cases, the environments in which antennas are deployed for such purposes are also subject to noise and interference from various sources of electromagnetic (EM) emission. When noise and interference are received contemporaneously with a signal of interest at an antenna, it can be difficult to isolate the signal of interest from the noise and interference in the output of the antenna. Identification of a time period during which the signal of interest is present in the output of the antenna can aid in processing of the antenna output to isolate the signal of interest. Conventionally, power threshold detectors that are tuned to specific characteristics of the signal of interest and interfering signals in the output of the antenna are used to identify a time period during which the output of the antenna includes the signal of interest. Conventional power threshold detectors therefore require advance knowledge of expected signal parameters of the interfering signals and the signal of interest.

SUMMARY

The following is a brief summary of subject matter that is described in greater detail herein. This summary is not intended to be limiting as to the scope of the claims.

Various technologies pertaining to a power threshold detector for identifying a time period during which a signal (e.g., the output of an antenna) includes a signal of interest are described herein. In an exemplary embodiment, a plurality of signals is received at an antenna simultaneously over a period of time, wherein the plurality of signals includes the signal of interest. A data system receives the output of the antenna and outputs data indicative of the amplitude or power of the antenna output. For example, the data system can include an analog-to-digital converter (ADC), and the ADC can output a plurality of digital values indicative of an amplitude of the antenna output at a plurality of times in the period of time.

A computing system receives the data from the data system and identifies a plurality of times in the period of time for which the signal of interest is present in the output of the antenna. The identifying the plurality of times is based upon determining that a ratio of an amplitude of the antenna signal at the plurality of times to the mean amplitude of the antenna signal over the entire period of time exceeds a pre-defined threshold value. In one example, the computing system performs an iterative process for identifying a plurality of times at which the signal of interest is present. In the iterative process, a peak value of the antenna signal is identified and a ratio of the peak value to the mean amplitude of the antenna signal is computed. If the ratio exceeds the pre-defined threshold value, the computing device stores the time corresponding to the peak value. The peak value is then removed from a plurality of values comprising the signal and another iteration of the process begins. An updated mean value of the signal is computed. A next-highest peak value is then identified, and a new ratio of the next-highest peak value to the updated mean value is calculated. If the new ratio exceeds the threshold, the computing device stores the time corresponding to the next-highest peak value, removes the next-highest peak value from the plurality of values comprising the signal, and begins another iteration of the process. The process continues iteratively until the computed ratio in an iteration does not exceed the threshold, whereupon the process ends. The computing device then outputs an indication of a subset of the period of time of the antenna signal during which the antenna signal is likely to include the signal of interest. The indication is output based upon the stored times corresponding to the peak values identified in the iterative process described above.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
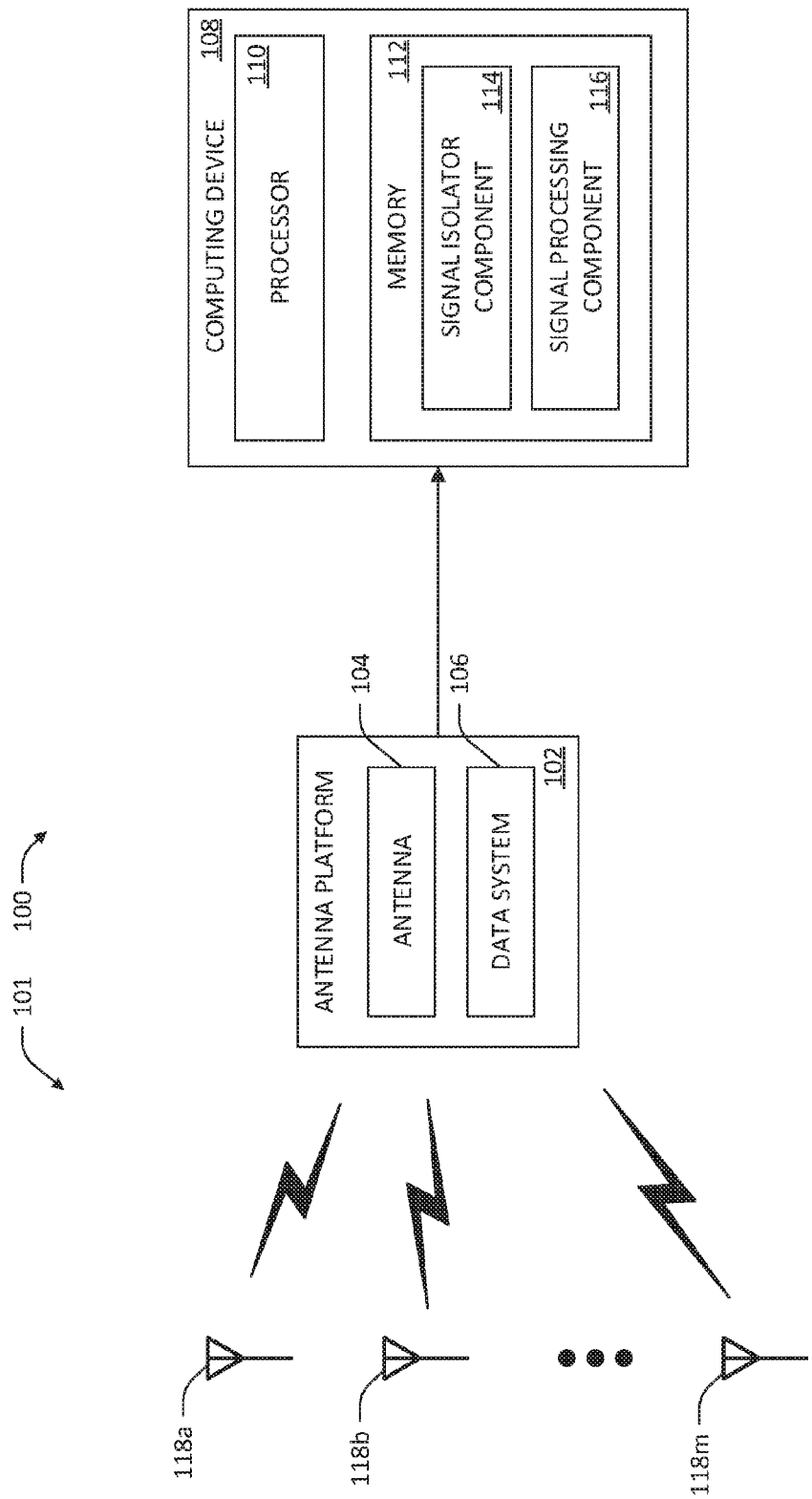
FIG. 1 is a functional block diagram of an exemplary system that facilitates identification of a time period for which a signal of interest is present in a signal received by way of an antenna.

Various technologies pertaining to detection of an underlying signal of interest in a signal including noise and interference from other signals are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary system 100 that facilitates detection of an underlying signal of interest in a composite signal received from an operational environment 101 of the system 100 is illustrated. The system 100 includes an antenna platform 102 (e.g., an aircraft or other vehicle, a stationary antenna platform, etc.) on which are mounted an antenna 104 and a data system 106. The system 100 further includes a computing device 108 that receives data from the data system 106. The computing device comprises a processor 110 and memory 112 that comprises instructions that are executed by the processor 110. The memory 112 includes a signal isolator component 114 that identifies a period of time for which a signal of interest is present in a composite signal based upon a ratio of a peak amplitude of the composite signal to a mean amplitude of the composite signal. Particularly when the signal of interest has a greater average amplitude than other signals comprising the composite signal, the amplitude of the composite signal is expected to be high when the signal of interest is present relative to when the signal of interest is not present.

The memory 112 also includes a signal processing component 116 that performs signal processing operations with respect to the signal of interest based upon the period of time identified by the signal isolator component 114. When signal processing operations are performed on a composite signal that is time-limited to only those times that include the signal of interest, a signal-to-noise ratio of an output of the signal processing component 116 is increased relative to when the composite signal is processed over a period including times at which the signal of interest is not present.

Operations of the system 100 are now described. The antenna platform 102 operates in the operational environment 101. By way of example, if the antenna platform 102 is an aircraft, the operational environment 101 can be an airspace through which the platform 102 is flying. In another example, the platform 102 can be a fixed tower or other structure on which the antenna 104 is mounted, and the operational environment 101 can be a region surrounding the fixed structure. The operational environment 101 includes a plurality of sources of EM radiation 118a-118m. The antenna 104 receives signals from the sources 118a-118m simultaneously, and outputs a composite signal to the data system 106, the composite signal comprising a superposition of the signals received from the sources 118a-118m, wherein the signal received from one of the sources 118a-118m is the signal of interest. The composite signal can be considered to comprise the signal of interest and a third signal that is a sum of all other signals received from the various sources 118a-118m (wherein such signals include noise and interference). Generally, the third signal has a time duration that is longer than a time duration of the signal of interest. Systems and methods described herein are well suited to identifying when the signal of interest is present in the composite signal when the third signal comprises a plurality of single-frequency tones within a bandwidth β and the signal of interest has a bandwidth less than or equal to β. The sources 118a-118m can include EM emitters such as antennas, or the sources 118a-118m can include objects that reflect EM radiation emitted by other objects.

Referring again to FIG. 1, the data system 106 receives the composite signal output by the antenna 104. The data system 106 is configured to output composite signal data indicative of one or more characteristics of the composite signal over a sample period of time. For example, the data system 106 can include an ADC that digitally samples the analog composite signal and outputs a plurality of digital values indicative of an amplitude of the composite signal at a corresponding plurality of times.

The computing device 108 receives the composite signal data generated by the data system 106. Responsive to receiving the composite signal data, the signal isolator component 114 iteratively analyzes the composite signal data to identify times in the sample period of time for which the signal of interest is present in the composite signal. In an exemplary embodiment, the signal isolator component 114 can begin by applying a smoothing filter to the composite signal data (e.g., a moving average filter). The smoothing filter applied by the signal isolator component 114 is configured to reduce variance of the composite signal data, which can aid in reducing a likelihood that the signal isolator component 114 will falsely identify a time as including or not including the signal of interest.

In each iteration, the signal isolator component 114 identifies a maximum value of the composite signal based upon the composite signal data. The signal isolator component 114 also computes a mean value of the composite signal based upon the composite signal data. The signal isolator component 114 computes a ratio of the maximum value of the composite signal to the mean value of the composite signal. The signal isolator component 114 then compares the ratio to a predefined threshold value. The signal isolator component 114 compares the ratio to the threshold and determines whether or not the ratio is greater than the threshold. If the ratio is less than or equal to the threshold, the signal isolator component 114 can output an indication that the composite signal does not include the signal of interest at a time corresponding to the maximum value. If the ratio is greater than the threshold, the signal isolator component 114 can cause an indication of the time corresponding to the maximum value to be stored in the memory 112. The signal isolator component 114 can then begin another iteration to identify another time where the composite signal includes the signal of interest.

A value of the threshold can be defined based upon a desired false alarm rate for the signal isolator component 114 in identifying times for which the signal of interest is present in the composite signal. For example, when the threshold value is lowered, it becomes more likely that times identified by the signal isolator component 114 as times for which the composite signal includes the signal of interest do not actually include the signal of interest. Similarly, when the threshold value is raised, it becomes more likely that times identified by the signal isolator component 114 as including the signal of interest do, in fact, include the signal of interest. The threshold value can further be based upon a difference in average amplitude between the signal of interest and other signals comprising the composite signal.

Figure 2:
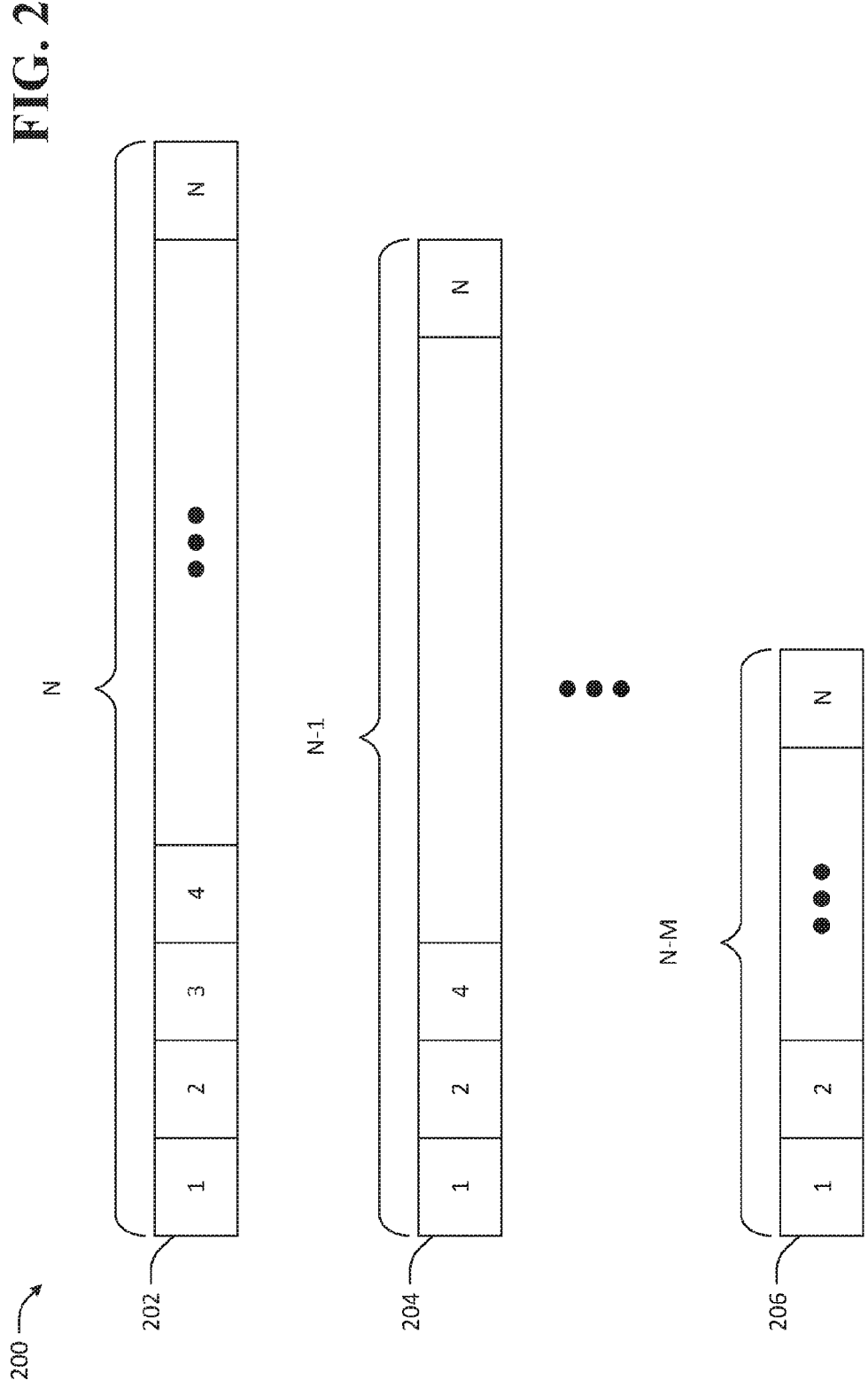
FIG. 2 is a diagram of exemplary signal data for a plurality of iterations of a process for identifying a time period for which a signal of interest is present in a received signal.

In a subsequent iteration, the signal isolator component 114 updates the composite signal data to remove the maximum value from the composite signal data. Thus, after the composite signal data is updated by the signal isolator component 114, the updated composite signal data does not include the original maximum value identified by the signal isolator component 114 as described above. By way of example, and referring now to FIG. 2, exemplary signal data 200 is shown for a plurality of iterations 202-206 of a process executed by the signal isolator component 114, wherein the signal data 200 comprises a plurality of samples. The exemplary signal data in a first iteration 202 comprises a plurality of N samples. In updating the signal data 200 between the first iteration and a second iteration, the signal isolator component 114 removes an identified maximum value of the first iteration of the signal data 202. Thus, for example, if the maximum value of the first iteration of the signal data 202 is the third sample, the signal isolator component 114 removes the third sample from the first iteration of the signal data 202 prior to the second iteration. In the second iteration, therefore, the second iteration of the signal data 204 comprises N−1 samples. A maximum of the updated signal data in the second iteration 204 is therefore a maximum of the remaining N−1 samples. Likewise, the mean of the updated signal data in the second iteration 204 is a mean of the remaining N−1 samples. As the signal isolator component 114 executes a plurality of M iterations, a maximum value is removed from the signal data 200 between each iteration. The Mth iteration of the signal data 206 therefore comprises N−M values.

Continuing the subsequent iteration, the signal isolator component 114 computes an updated mean value of the updated composite signal data. The signal isolator component 114 then identifies a next-highest value of the composite signal, the next highest value being a maximum of the updated composite signal data. The signal isolator component 114 computes a new ratio of the next-highest value of the composite signal to the updated mean value of the composite signal. The signal isolator component 114 determines whether the new ratio is greater than the predefined threshold. As before, if the new ratio is greater than the threshold, the signal isolator component 114 causes an indication of the time corresponding to the next-highest value to be stored in the memory 112. The signal isolator component 114 then updates the composite signal data again by removing the next-highest value, and computes another updated mean value of the composite signal data. The signal isolator component 114 then begins another iteration of the process by identifying another next-highest value of the composite signal based upon the again-updated composite signal data. The process can be continued until a predefined number of iterations is completed. In another example, the process can be continued until the signal isolator component 114 identifies that the ratio of a next-highest value to an updated mean is less than the threshold value. By iteratively identifying times for which the signal of interest is present in the composite signal as described herein, the signal isolator component 114 can more efficiently identify a subset of time for which the signal of interest is present in the composite signal than a system that analyzes all values of the composite signal data.

Responsive to identifying one or more times in the period of time for which the composite signal includes the signal of interest, the signal isolator component 114 can output data indicative of a subset of time in the period of time for which the signal of interest is present. For example, the signal isolator component 114 can output data indicative of the one or more identified times. In another example, the signal isolator component 114 can output data indicative of a window of time for which the signal of interest is present based upon an earliest identified time and a latest identified time. The data indicative of the window of time can be data indicative of the earliest identified time and the latest identified time.

The signal isolator component 114 can further identify a plurality of windows of time for which the signal of interest is present in the composite signal. For example, if the signal of interest is an intermittent signal, the signal of interest may be present from $t_1$ to $t_2$, absent from $t_2$ to $t_3$, and present again from $t_3$ to $t_4$, where $t_{1-4}$ are times in the period of time of the composite signal. The signal isolator component 114 can be configured to identify the windows of time based upon various criteria. Referring to the intermittent signal example above, the signal isolator component 114 can identify that the signal of interest is present from $t_1$ to $t_2$ based upon identifying that the signal of interest is present at $t_1$ and $t_2$ and determining that $t_1$ and $t_2$ are less than a threshold amount of time apart. Continuing the example, the signal isolator component 114 can identify that the signal of interest is absent from $t_2$ to $t_3$ based upon identifying that the signal of interest is present at $t_2$ and $t_3$ but that they are greater than the threshold amount of time apart. The signal isolator component 114 can then output data indicative of the identified windows of time.

It is to be understood that while in exemplary embodiments signals are described as being received by way of an antenna, systems and methods described herein are applicable to other signals, such as signals transmitted by wire connection, digital representations of signals, etc.

Figure 3:
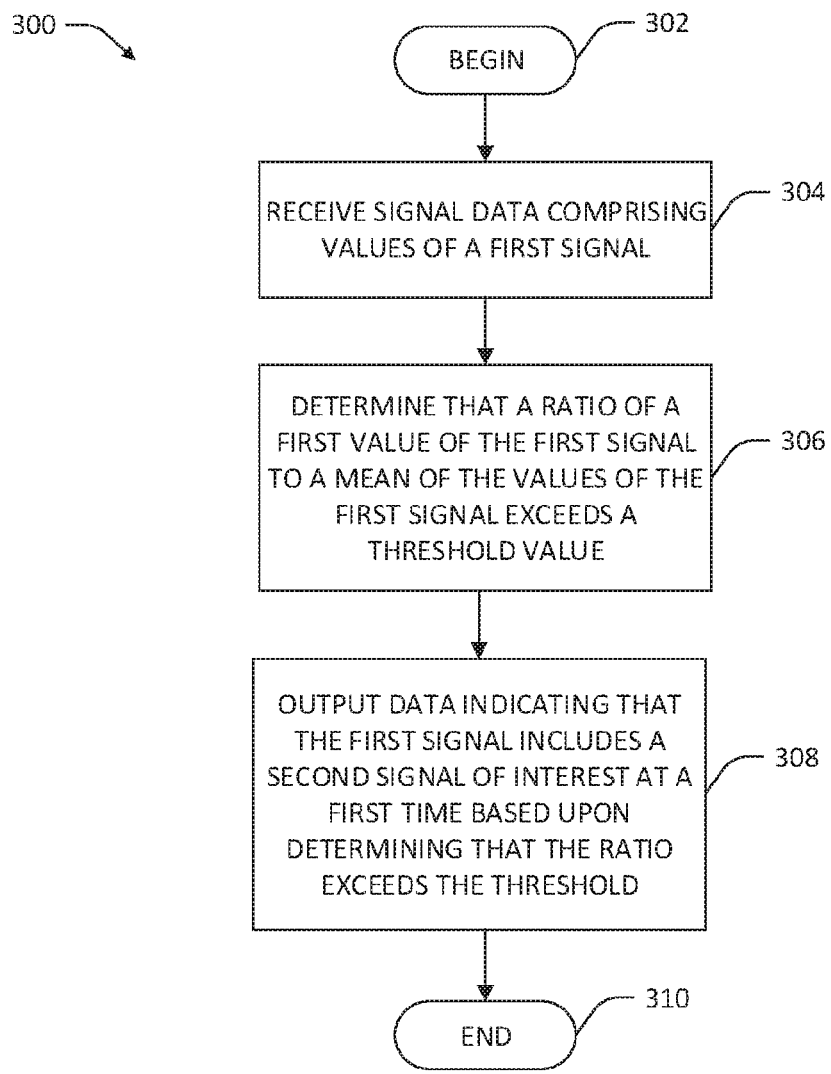
FIG. 3 is a flow diagram that illustrates an exemplary methodology for identifying a time for which a signal of interest is present in a signal received by way of an antenna.
Figure 4:
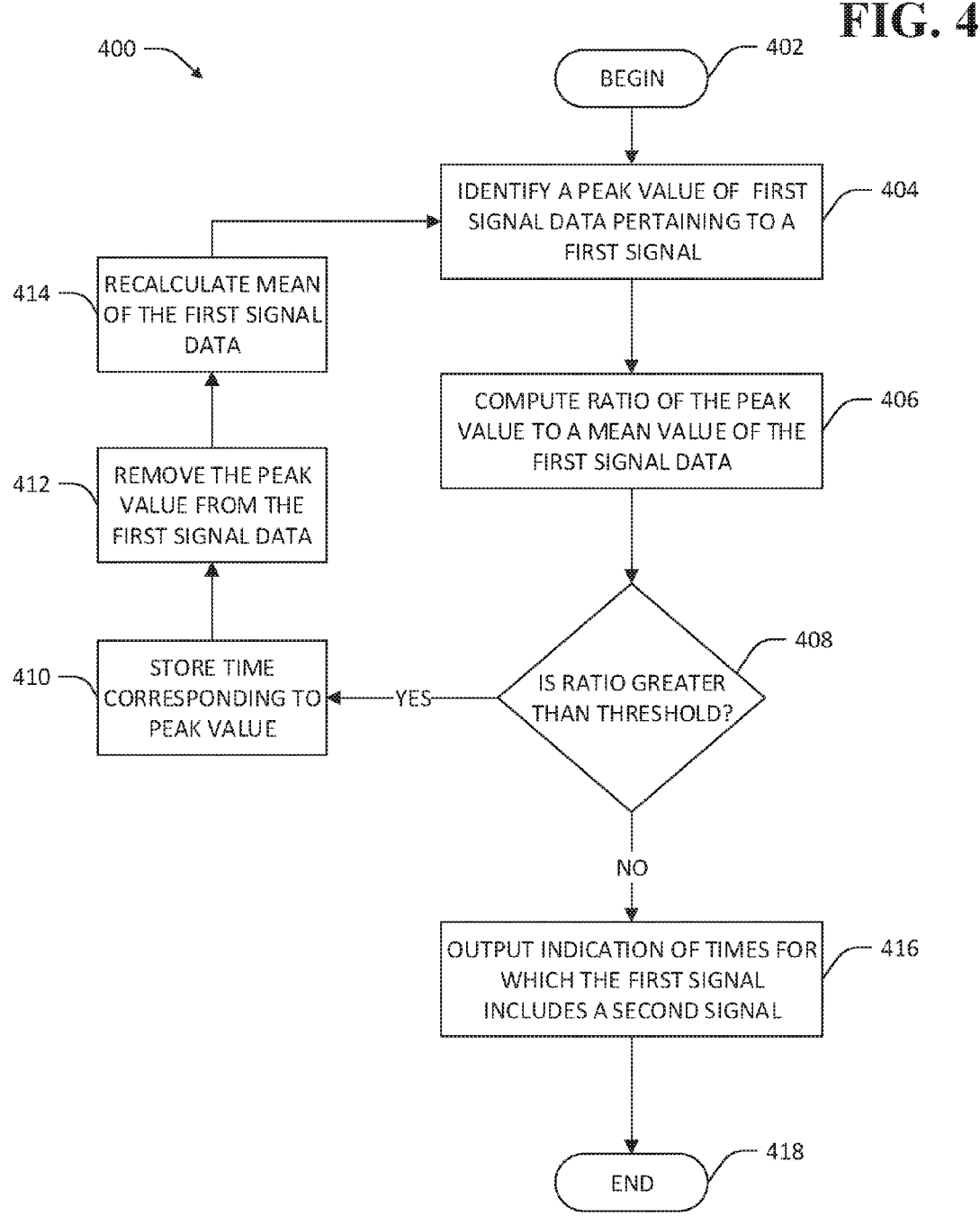
FIG. 4 is a flow diagram that illustrates an exemplary methodology for identifying a plurality of times for which a signal of interest is likely to be present in a signal received by way of an antenna.

FIGS. 3-4 illustrate exemplary methodologies relating to identifying times for which a signal includes another signal of interest. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 3, a methodology 300 that facilitates identifying that a first signal includes a second signal of interest is illustrated. The methodology 300 begins at 302, and at 304 signal data is received that comprises values of a first signal. The first signal is a signal that comprises a second signal of interest and at least one other signal. For example, the first signal can be a signal received by way of a radar antenna, wherein the second signal of interest is an echo return of the radar antenna and the at least one other signal is noise emitted by a radio antenna. The signal data can be a plurality of digitally sampled values of the first signal (e.g., as generated by an ADC) at a plurality of times in a period of time. At 306, a ratio of a first value of the first signal to a mean of the values of the first signal is determined to exceed a threshold value. The first value can be, for example, a maximum value of first signal. The threshold value can be a predefined value determined based upon a desired false alarm rate of a system for identifying when the first signal includes the second signal of interest. From the ratio exceeding the threshold value it can be inferred that the first signal includes the second signal at a first time corresponding to the first value. At 308 data is output that indicates that the first signal includes the second signal of interest at the first time based upon determining that the ratio exceeds the threshold. In one exemplary embodiment, the data can be an indication of the first time. At 310 the methodology 300 ends.

Referring now to FIG. 4, a methodology 400 that facilitates iteratively identifying a plurality of times for which a first signal includes a second signal of interest is illustrated. The methodology 400 begins at 402 and 404 a peak value of first signal data is identified, wherein the first signal data is based upon the first signal (e.g., the first signal data can be digitally sampled values of the first signal). At 406 a ratio of the identified peak value to the mean value of the first signal data is computed. At 408, a determination is made as to whether the computed ratio is greater than a threshold value. If the computed ratio is greater than the threshold value, the methodology 400 proceeds to 410, whereupon a time corresponding to the peak value is stored (e.g., in computer memory as data indicative of the time). At 412, the peak value identified at 404 is removed from the first signal data, whereupon at 414 the mean value of the first signal data is recalculated based upon remaining values in the first signal data.

The methodology 400 then begins a second iteration, wherein at 404 a new peak value of the first signal data is identified. Thus, in the second iteration, at 404 a second-highest value of the first signal is the new peak value of the first signal data. At 406 a new ratio of the new peak value to the recalculated mean value is computed, and at 408 it is determined whether the new ratio is greater than the threshold. If the new ratio is greater than the threshold, the time corresponding to the new peak value is stored at 410, the new peak value is removed from the first signal data at 412, and the mean is recalculated again based upon the newly updated first signal data at 414. The methodology 400 then begins a third iteration. At 408, if the new ratio is not greater than the threshold, then an indication of times for which the first signal includes the second signal of interest is output at 416 based upon the times stored at 410. Thus, the indication of times for which the first signal includes a second signal is based upon values of the first signal data for which the ratio of the value to the mean of the first signal data is greater than the threshold. The methodology 400 then ends at 418.

Figure 5:
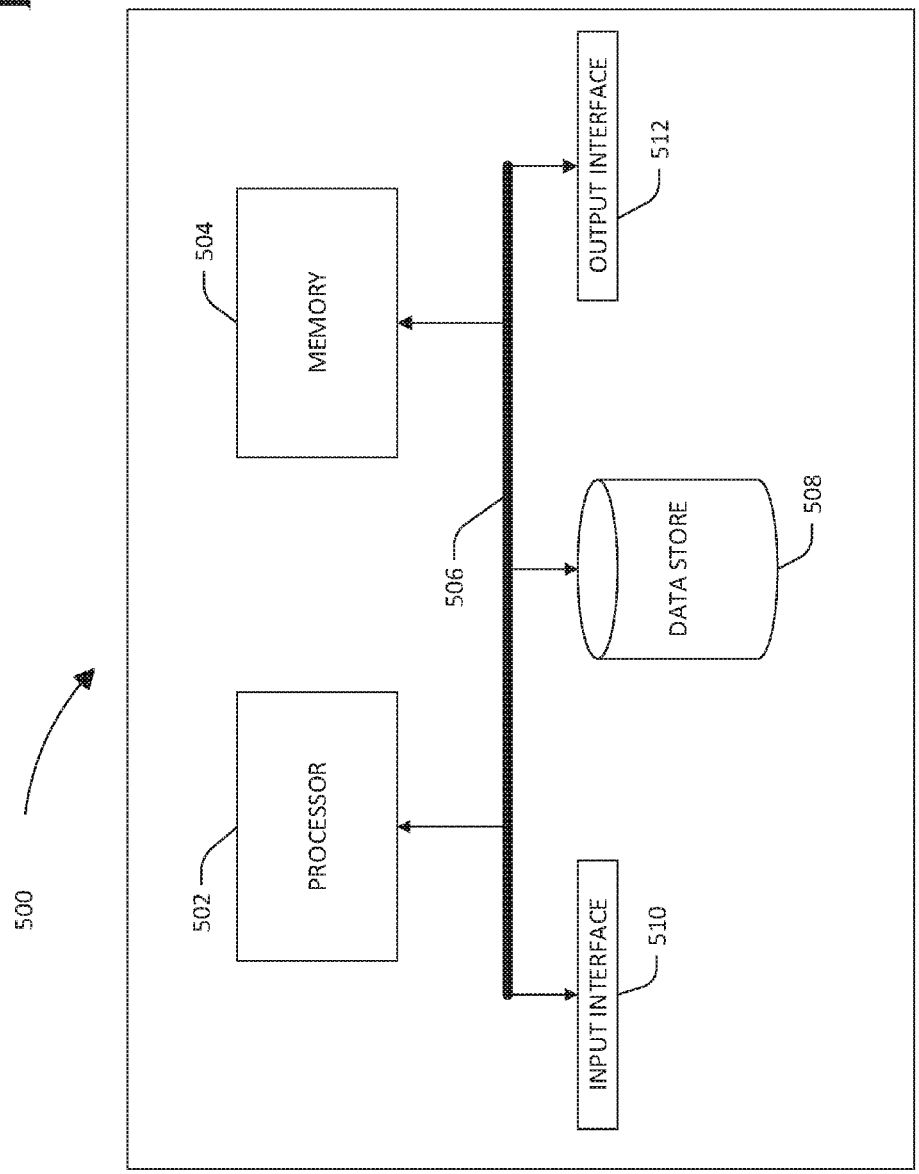
FIG. 5 is an exemplary computing system.

Referring now to FIG. 5, a high-level illustration of an exemplary computing device 500 that can be used in accordance with the systems and methodologies disclosed herein is illustrated. For instance, the computing device 500 may be used in a system that facilitates identification of times for which a signal includes a signal of interest. By way of another example, the computing device 500 can be used in a system that generates data indicative of a signal output by an antenna. The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store signal data, times identified as being times for which a signal includes a signal of interest, etc.

The computing device 500 additionally includes a data store 508 that is accessible by the processor 502 by way of the system bus 506. The data store 508 may include executable instructions, signal data, data indicative of times for which a signal includes a signal of interest etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc. by way of the output interface 512.

It is contemplated that the external devices that communicate with the computing device 500 via the input interface 510 and the output interface 512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 500 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   at least one processor; and
   memory comprising instructions that, when executed by the at least one processor, cause the at least one processor to perform acts comprising:
   receiving a first signal, the first signal based upon output of an antenna, the first signal taking a plurality of values over a period of time, the first signal comprising a second signal of interest and a third signal, the second signal present for a subset of the period of time;
   identifying that the first signal includes the second signal of interest at a first time in the period of time based upon determining that a ratio of an amplitude of the first signal at the first time to a mean amplitude of the first signal over the period of time exceeds a threshold value; and
   outputting an indication of the subset of the period of time based upon the identifying that the first signal includes the second signal at the first time.

2. The system of claim 1, wherein the third signal comprises a plurality of single-frequency tones.

3. The system of claim 2, wherein the plurality of single-frequency tones lie within a first bandwidth, the second signal having a second bandwidth that is less than or equal to the first bandwidth.

4. The system of claim 1, wherein the second signal has a greater average amplitude than the third signal.

5. The system of claim 1, the acts further comprising:
   identifying that the first signal includes the second signal of interest at a second time in the period of time based upon determining that a ratio of an amplitude of the first signal at the second time and the mean amplitude of the first signal over the period of time exceeds the threshold value; and
   wherein the outputting the indication of the subset of the period of time is further based upon the identifying that the first signal includes the second signal at the second time.

6. The system of claim 5, wherein the indication of the subset of the period of time comprises an indication that the subset is bounded by the first time and the second time.

7. The system of claim 1, wherein identifying that the first signal includes the second signal of interest at the first time in the period of time comprises:
   identifying a maximum value of the first signal, wherein the first time in the period of time corresponds to the maximum value of the first signal; and
   determining that the ratio of the maximum value of the first signal to the mean amplitude of the first signal exceeds the threshold value.

8. The system of claim 1, the acts further comprising iteratively identifying that the first signal includes the second signal at a plurality of times in the period of time, and wherein outputting the indication of the subset of the period of time is based further upon the identifying that the first signal includes the second signal at the plurality of times in the period of time.

9. The system of claim 8, wherein the plurality of times comprises an earliest time and a latest time, wherein the indication of the subset of the period of time comprises an indication of the earliest time and the latest time in the plurality of times.

10. The system of claim 8, wherein iteratively identifying that the first signal includes the second signal at a plurality of times in the period of time comprises second acts of:
   a. computing a ratio of a maximum value of the first signal to the mean amplitude of the first signal over the period of time;
   b. responsive to determining that the ratio of the maximum value of the first signal to the mean amplitude of the first signal is greater than the threshold value, outputting data indicative of a time corresponding to the maximum value;
   c. updating values of the first signal by removing the maximum value from the values of the first signal, wherein in subsequent iterations the maximum value of the first signal and the mean amplitude of the first signal are based upon updated values of the first signal; and
   d. repeating the second acts of a, b, and c until the ratio of the maximum value of the first signal to the mean amplitude of the first signal is less than or equal to the threshold value; and
   wherein outputting the indication of the subset of the period of time is based upon the data indicative of the times corresponding to the maximum values output at b.

11. The system of claim 1, the acts further comprising applying a smoothing filter to the first signal prior to identifying that the first signal includes the second signal at the first time.

12. The system of claim 11, wherein the smoothing filter is a moving average filter.

\* \* \* \* \*